United States Patent
Satish

(10) Patent No.: US 9,361,460 B1
(45) Date of Patent: *Jun. 7, 2016

(54) DETECTING MALWARE THROUGH PACKAGE BEHAVIOR

(71) Applicant: Symantec Corporation, Mountain View, CA (US)

(72) Inventor: Sourabh Satish, Fremont, CA (US)

(73) Assignee: Symantec Corporation, Mountain View, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 13/948,026

(22) Filed: Jul. 22, 2013

Related U.S. Application Data

(63) Continuation of application No. 12/511,885, filed on Jul. 29, 2009, now Pat. No. 8,499,350.

(51) Int. Cl.
*G06F 21/00* (2013.01)
*G06F 21/56* (2013.01)

(52) U.S. Cl.
CPC .................... *G06F 21/566* (2013.01)

(58) Field of Classification Search
CPC .......... H04L 29/06911; H04L 29/06918; H04L 63/1416; H04L 63/1408; H04L 63/145; H04L 63/1441; H04L 63/1458; G06F 21/56; G06F 21/561; G06F 21/562; G06F 21/563; G06F 21/564; G06F 21/565; G06F 21/566; G06F 21/552; G06F 21/567
USPC .................................................... 726/22–25
See application file for complete search history.

(56) References Cited

U.S. PATENT DOCUMENTS

| | | | |
|---|---|---|---|
| 6,088,803 A | 7/2000 | Tso et al. | |
| 7,103,913 B2 * | 9/2006 | Arnold et al. | 726/22 |
| 7,448,084 B1 | 11/2008 | Apap et al. | |
| 7,472,420 B1 * | 12/2008 | Pavlyushchik | 726/24 |
| 7,523,500 B1 | 4/2009 | Szor et al. | |
| 7,594,272 B1 | 9/2009 | Kennedy et al. | |
| 7,602,775 B1 * | 10/2009 | Ke et al. | 370/386 |
| 2002/0194490 A1 | 12/2002 | Halperin et al. | |
| 2004/0064736 A1 * | 4/2004 | Obrecht et al. | 713/201 |
| 2005/0039082 A1 | 2/2005 | Nachenberg | |
| 2006/0259967 A1 * | 11/2006 | Thomas et al. | 726/22 |
| 2009/0089040 A1 * | 4/2009 | Monastyrsky | G06F 21/566 703/26 |
| 2010/0293615 A1 * | 11/2010 | Ye | G06F 21/566 726/22 |

FOREIGN PATENT DOCUMENTS

| | | |
|---|---|---|
| EP | 1971102 | 9/2008 |
| EP | 2182458 | 5/2010 |

OTHER PUBLICATIONS

Acquisition of Malicious Code Using Active Learning, Moskovitch., et al. Year 2008.*

(Continued)

*Primary Examiner* — Michael Pyzocha
(74) *Attorney, Agent, or Firm* — Fenwick & West LLP

(57) ABSTRACT

A file on a computer system is evaluated against trust criteria to determine whether the file is compatible with the trust criteria. Responsive to the file being incompatible with the trust criteria, the file is assigned to a package. Files assigned to the package are tracked to determine whether the files collectively perform malicious behavior. The package is convicted as malware responsive to the files in the package collectively performing malicious behavior.

20 Claims, 4 Drawing Sheets

(56) References Cited

OTHER PUBLICATIONS

Bayer, Ulrich, et al. "Scalable, Behavior-Based Malware Clustering." NDSS. vol. 9. 2009, pp. 1-18.*

Delio, M., "Virus Throttle a Hopeful Defense", Wired News, Dec. 9, 2002 [online] Retrieved from the Internet <URL:http://www.wired.com/news/infostructure/0,1377,56753,000.html>-.

Lowe, R. et al., WinXP Pro File Sharing, Practically Networked, Dec. 12, 2001, [online] [Retrieved on Jun. 10, 2003] Retrieved from the Internet <URL:http//www.practicallynetworked.com/sharing/xp.sub.--filesharing/w- hole.htm>.

Microsoft web pages, "Microsoft Palladium: A Business Overview," pp. 1-10 [online], Amy Carroll, Mario Juarez, Julia Polk and Tony Leininger, Aug. 2002 [retrieved on Oct. 10, 2002]. Retrieved from the Internet: <URL:http://www.microsoft.com/PressPass/features/2002/jul02/0724pallad-iumwp.asp>.

Microsoft web pages, "Microsoft Palladium Initiative—Technical FAQ," pp. 1-8 [online], Aug. 2002 [retrieved on Oct. 10, 2002]. Retrieved from the Internet: <URL:http://www.microsoft.com/technet/security/news/PallFAQ2- .asp?frame=true>.

Moore, D. et al., Code-Red: A Case Study on the Spread and Victims of an Internet Worm, Proceedings of the Internet Measurement Workshop (IMW), 2002, [online] [Retrieved on Dec. 16, 2003] Retrieved from the Internet <URL:http://www.citeseer.nj.nec.com/moore02codered.html>.

New Windows Worms At Work in May web page, Shout Communications, [online] [Retrieved on Dec. 16, 2003] Retrieved from the Internet <URL:http://www.shoutasia.com/trend/clients.sub.—trend.sub.—may.sub.—virus.htm>.

Parkhouse, Jayne, "Pelican SafeTNet 2.0" [online], Jun. 2000, SC Magazine Product Review, [retrieved on Dec. 1, 2003]. Retrieved from the Internet: <URL: http://www.scmagazine.com/scmagazine/standalone/pelican/sc.sub.—pelican.html>.

Staniford, S. et al., How to Own the Internet in Your Spare Time, Proceedings of the 11the USENIX Security Symposium, 2002, [online] [Retrieved on Dec. 16, 2003] Retrieved from the Internet <URL://http://citeseer.nj.nec.com/staniford02how.html>.

Toth, T. et al., Connection-History Based Anomaly Detection, Proceedings of the 2002 IEEE, Workshop on Information Assurance and Security, Jun. 2002, pp. 30-35, vol. 17-19, United States Military Academy, West Point, N.Y.

Trusted Computing Platform Alliance, "Building a Foundation of Trust in the PC," pp. 1-9, Jan. 2000.

Trusted Computing Platform Alliance web pages. "TCPA / Palladium Frequently Asked Questions," pp. 1-13 [online], Ross Anderson [retrieved on Oct. 10, 2002]. Retrieved from the Internet: <URL:http://www.cl.cam.ac.uk/.about.rja14/tcpa-faq.html>.

Tucek, J. et al., "Sweeper: A Lightweight End-to-End System for Defending Against Fast Worms," EuroSys '07: Proceedings of the 2.sup.nd ACM SIGOPS/EuroSys European Conference on Computer Systems 2007, Jun. 2007, pp. 115-128, ACM.

Williamson, M., "Throttling Viruses: Restricting Propagation to Defeat Malicious Mobile Code", ACSAC Conference, Dec. 2002, pp. 1-9, Hewlett-Packard, Dec. 10, 2002.

Windows XP Simple File Sharing web page, Practically Networked, [online] [Retrieved on Jun. 10, 2003] Retrieved from the Internet <URL:http://www.practicallynetworked.com/sharing/xp/filesharing.htm>-.

United States Office Action, U.S. Appl. No. 12/511,885, Mar. 23, 2012, 13 pages.

United States Office Action, U.S. Appl. No. 12/511,885, Jan. 4, 2013, 13 pages.

* cited by examiner

DETECTING MALWARE THROUGH PACKAGE BEHAVIOR

CROSS-REFERENCE TO RELATED APPLICATION

This application is a continuation of U.S. patent application Ser. No. 12/511,885, filed Jul. 29, 2009, which is hereby incorporated herein by reference. Additionally, this application is related to U.S. patent application Ser. No. 10/959,484, filed Oct. 5, 2004, which is hereby incorporated herein by reference.

BACKGROUND OF THE INVENTION

1. Field of the Invention

This invention pertains in general to computer security and in particular to detecting malware and/or other types of malicious software.

2. Description of the Related Art

There is a wide variety of malicious software (malware) that can attack modern computers. Malware threats include computer viruses, worms, Trojan horse programs, spyware, adware, crimeware, and phishing websites. Modern malware is often designed to provide financial gain to the attacker. For example, malware can surreptitiously capture important information such as logins, passwords, bank account identifiers, and credit card numbers. Similarly, the malware can provide hidden interfaces that allow the attacker to access and control the compromised computer.

An approach used by security software to detect classic malware is the behavior monitoring approach. The behavior monitoring approach consists of monitoring the behavior of individual files on a computer system. If a file performs a malicious behavior, the file is convicted as malware. To evade security software, attackers have developed malware that is comprised of multiple files. For example, malware may be comprised of multiple executable files, dynamic link library files, and data files. Each file of the malware helps perform the attack on the computer system. However, the behavior performed by each file is not malicious enough for the file to be convicted by security software. Thus, the security software is not able to detect and stop the attack by the malware.

Accordingly, there is a need in the art for ways to detect malware comprised of multiple files.

BRIEF SUMMARY OF THE INVENTION

The above and other needs are met by a method, a computer program product, and a computer system for detecting malware on a computer system. Embodiments of the method comprise evaluating a file on the computer system against trust criteria to determine whether the file is compatible with the trust criteria. The file is assigned to a package responsive to the file being incompatible with the trust criteria. Files assigned to the package are tracked to determine whether the files collectively perform malicious behavior. The package is convicted as malware responsive to the files in the package collectively performing malicious behavior.

Embodiments of the computer program product have a computer-readable storage medium having computer-executable code. The computer-executable code comprises a trust module configured to evaluate a file on the computer system against trust criteria to determine whether the file is compatible with the trust criteria. The computer-executable code further comprises a package module configured to assign the file to a package of one or more files, responsive to the file being incompatible with the trust criteria. The computer-executable code further comprises a behavior monitoring module configured to track files assigned to the package to determine whether the files collectively perform malicious behavior. The computer-executable code further comprises a remediation module configured to convict the package as malware responsive to the files in the package collectively performing malicious behavior.

Embodiments of the computer system comprise a computer processor and a computer-readable storage medium storing computer program modules configured to execute on the computer processor. The computer program modules comprise a trust module configured to evaluate a file on the computer system against trust criteria to determine whether the file is compatible with the trust criteria. The computer program modules further comprise a package module configured to assign the file to a package of one or more files, responsive to the file being incompatible with the trust criteria. The computer program modules further comprise a behavior monitoring module configured to track files assigned to the package to determine whether the files collectively perform malicious behavior. The computer program modules further comprise a remediation module configured to convict the package as malware responsive to the files in the package collectively performing malicious behavior.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The figures depict various embodiment of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
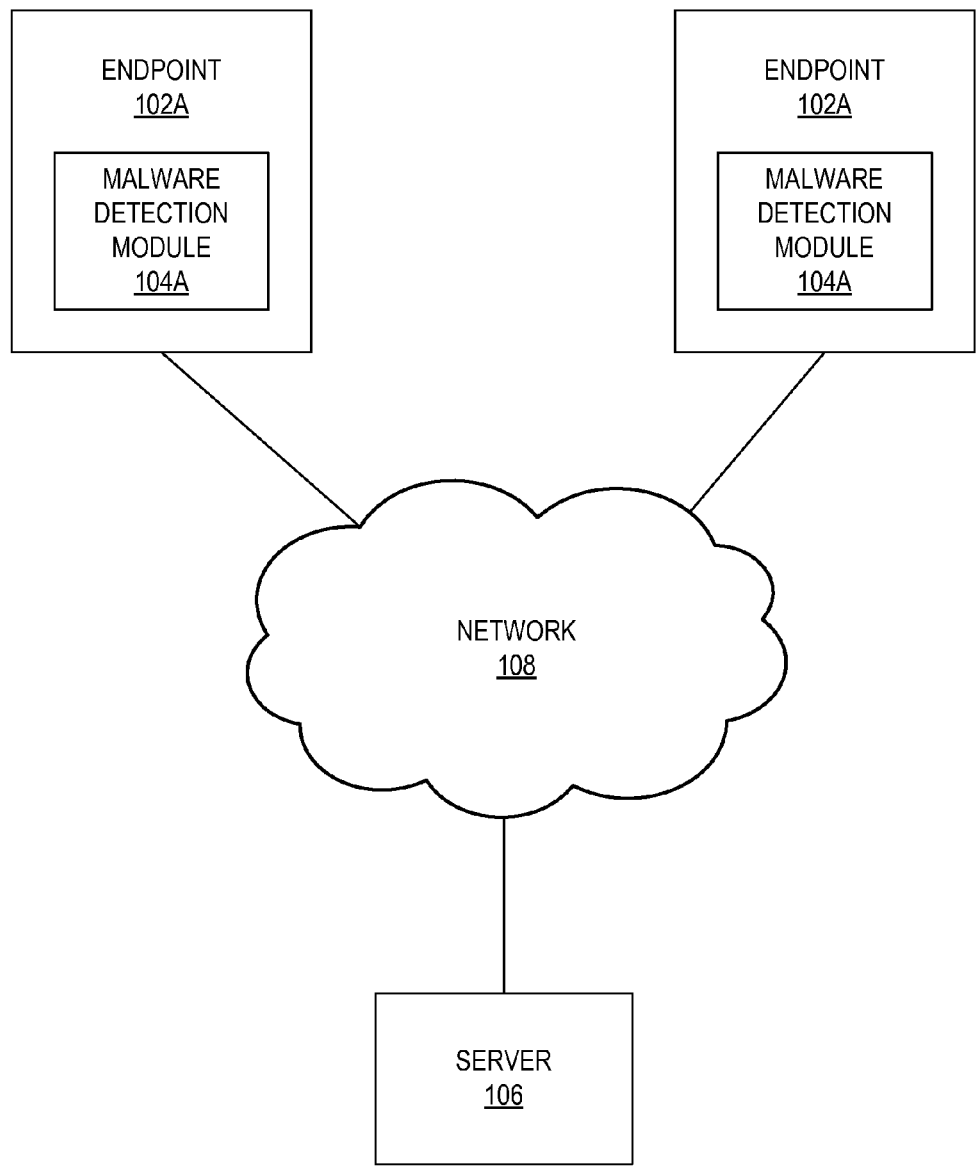
FIG. 1 is a high-level block diagram of a computing environment according to one embodiment.

FIG. 1 is a high-level block diagram of a computing environment 100 according to one embodiment. FIG. 1 illustrates two endpoints 102 and a server 106 connected by a network 108. Only two endpoints 102 are shown in FIG. 1 in order to simplify and clarify the description. Embodiments of the computing environment 100 can have thousands or millions of endpoints 102 connected to the network 108.

FIG. 1 and the other figures use like reference numerals to identify like elements. A letter after a reference numeral, such as "102A," indicates that the text refers specifically to the element having that particular reference numeral. A reference numeral in the text without a following letter, such as "104," refers to any or all of the elements in the figures bearing that reference numeral (e.g. "104" in the text refers to reference numerals "104A," and/or "104B" in the figures).

In one embodiment, an endpoint 102 is a computer used by one or more users to perform activities including downloading, installing, and/or executing files and browsing web sites on the network 108. The endpoint 102, for example, can be a personal computer executing a web browser such as MICROSOFT INTERNET EXPLORER that allows the user to retrieve and display content from web servers and other computers on the network 108. In other embodiments, the endpoint 102 is a network-capable device other than a computer, such as a personal digital assistant (PDA), a mobile telephone, a pager, a television "set-top box," etc. For purposes of this description, the term "endpoint" also includes computers such as servers and gateways that encounter files or other entities that might constitute malware or other threats. For example, an endpoint 102 can be a network gateway located between an enterprise network and the Internet. The endpoint 102 can also be a mail server or web server that stores files that can be accessed by other endpoints 102.

The endpoint 102 executes a malware detection module 104 that provides security to the endpoint 102 by detecting malware on the endpoint 102, including malware comprised of multiple files. In one embodiment, the malware detection module 104 monitors the endpoint 102 for the creation of a file. If the creation of a file on the endpoint 102 is detected, the malware detection module 104 evaluates the newly created file against trust criteria. If the file satisfies the trust criteria, the file is labeled as being trusted. However, if the file does not satisfy the trust criteria, the file is labeled as being suspicious.

If the file is labeled as suspicious, the malware detection module 104 associates the file with a group of one or more files called a "package." The malware detection module 104 assigns the file to a newly-created package or to a previously-existing package. Files that are "touched," e.g., created, modified, and/or read, by a file in a package are added to that package.

The malware detection module 104 tracks the collective behaviors of the files in packages present on the endpoint 102. The malware detection module 104 compares the collective behavior of the files in each package to malware heuristics to determine whether the files in the package are collectively performing malicious behavior. If the collective behavior of the files in the package satisfies the conditions of a malware heuristic, the malware detection module 104 convicts the package as malware.

By using packages and tracking the collective behavior of files in the packages, the malware detection module 104 can detect malware comprised of multiple files. Even though the behavior performed by each file in a package may not be overtly malicious, the collective behavior of the files is sufficiently malicious to convict the package as malware.

The server 106 provides new malware heuristics and trust criteria to the malware detection modules 104 at the endpoints 102. In one embodiment, the server 106 receives from the malware detection modules 104 reports which include information on the behavior tracked for a package. In one embodiment, the server 106 only receives reports with information on packages that have been convicted by a malware detection module 104. The server 106 uses the reports received to create new malware heuristics.

The network 108 represents the communication pathways between the endpoints 102 and the server 106. In one embodiment, the network 108 is the Internet and uses standard communications technologies and/or protocols. Thus, the network 108 can include links using technologies such as Ethernet, 802.11, worldwide interoperability for microwave access (WiMAX), 3G, digital subscriber line (DSL), asynchronous transfer mode (ATM), InfiniBand, PCI Express Advanced Switching, etc. Similarly, the networking protocols used on the network 108 can include multiprotocol label switching (MPLS), the transmission control protocol/Internet protocol (TCP/IP), the User Datagram Protocol (UDP), the hypertext transport protocol (HTTP), the simple mail transfer protocol (SMTP), the file transfer protocol (FTP), etc. The data exchanged over the network 108 can be represented using technologies and/or formats including the hypertext markup language (HTML), the extensible markup language (XML), etc. In addition, all or some of links can be encrypted using conventional encryption technologies such as secure sockets layer (SSL), transport layer security (TLS), virtual private networks (VPNs), Internet Protocol security (IPsec), etc. In another embodiment, the entities can use custom and/or dedicated data communications technologies instead of, or in addition to, the ones described above.

Figure 2:
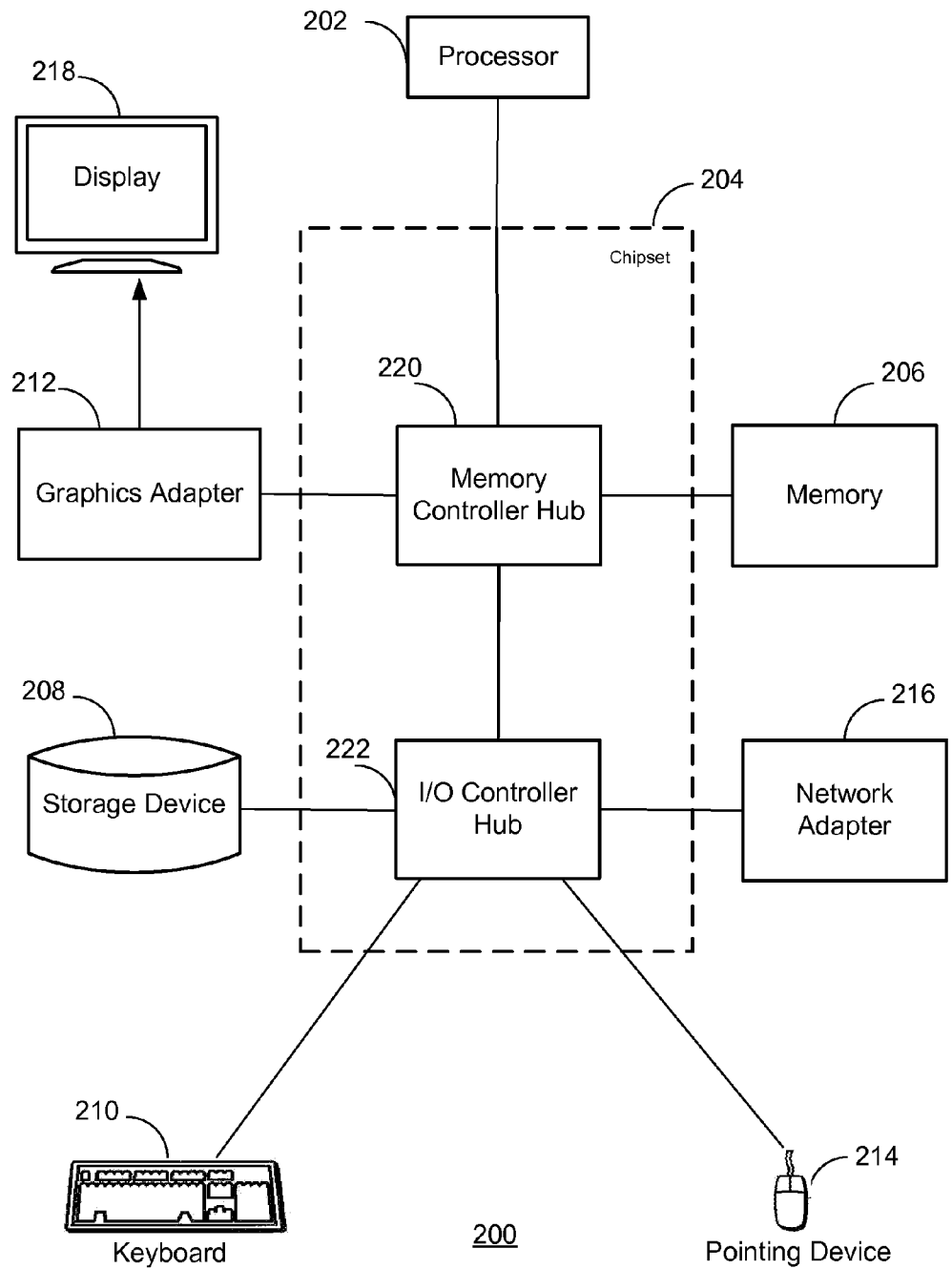
FIG. 2 is a high-level block diagram illustrating a functional view of a typical computer system for use as an endpoint or server according to one embodiment.

FIG. 2 is a high-level block diagram illustrating a typical computer 200 for use as an endpoint 102 or server 106. Illustrated are at least one processor 202 coupled to a chipset 204. Also coupled to the chipset 204 are a memory 206, a storage device 208, a keyboard 210, a graphics adapter 212, a pointing device 214, and a network adapter 216. A display 218 is coupled to the graphics adapter 212. In one embodiment, the functionality of the chipset 204 is provided by a memory controller hub 220 and an I/O controller hub 222. In another embodiment, the memory 206 is coupled directly to the processor 202 instead of the chipset 204.

The memory 206 holds instructions and data used by the processor 202. The pointing device 214 may be a mouse, track ball, or other type of pointing device, and is used in combination with the keyboard 210 to input data into the computer system 200. The graphics adapter 212 displays images and other information on the display 218. The network adapter 216 couples the computer system 200 to a local or wide area network.

The storage device 208 is any computer-readable storage medium, such as a hard drive, compact disk read-only memory (CD-ROM), DVD, or a solid-state memory device. As is known in the art, the storage device 208 holds instructions and data in logical constructs called "files." Depending upon the file system utilized on the storage device 108, each file can have one or more stored attributes describing the file. For example, the stored attributes can indicate the name of the file, the date on which the file was last modified, the number of times the file was accessed, the entity that created, accessed or last modified the file, etc. Some file systems support extensible attributes.

As is known in the art, a computer 200 can have different and/or other components than those shown in FIG. 2. In addition, the computer 200 can lack certain illustrated components. In one embodiment, a computer 200 acting as a server 106 lacks a keyboard 210, pointing device 214, graphics adapter 212, and/or display 218. Moreover, the storage device 208 can be local and/or remote from the computer 200 (such as embodied within a storage area network (SAN)).

This description utilizes the term "module" to refer to computer program logic for providing a specified functionality. A module can be implemented in hardware, firmware, and/or software. A module is typically stored on the storage device 208, loaded into the memory 206, and executed by the processor 202. A module can include one or more processes, and/or be provided by only part of a process. Embodiments of the entities described herein can include other and/or different modules than the ones described here. In addition, the functionality attributed to the modules can be performed by other or different modules in other embodiments. Moreover, this description occasionally omits the term "module" for purposes of clarity and convenience.

Figure 3:
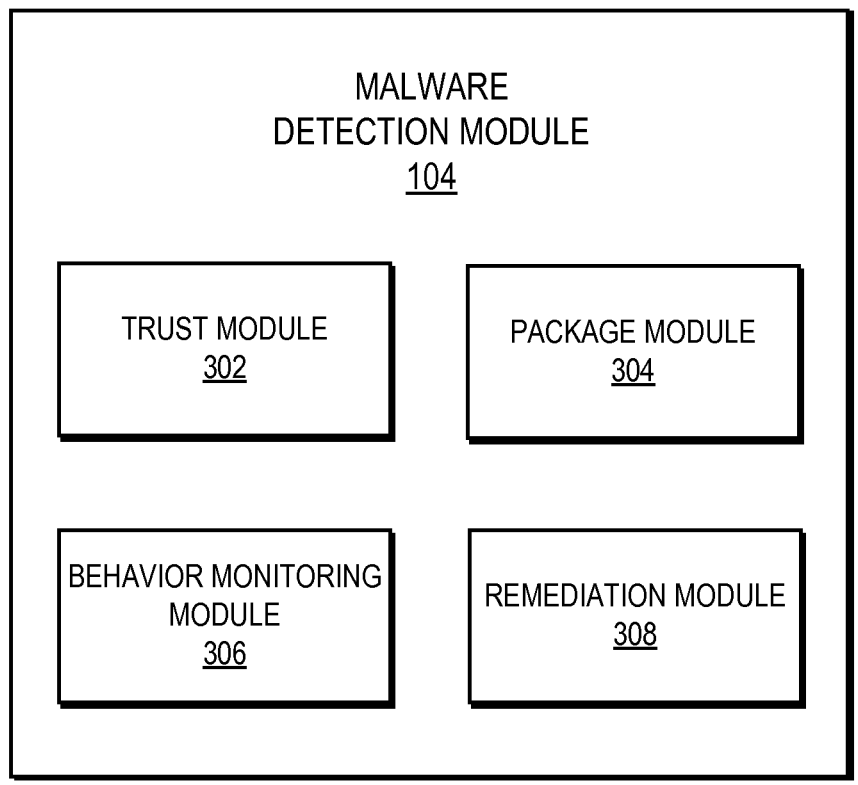
FIG. 3 is a high-level block diagram illustrating a detailed view of a malware detection module according to one embodiment.

FIG. 3 is a high-level block diagram illustrating a detailed view of the malware detection module 104 according to one embodiment. In some embodiments the malware detection module 104 is incorporated into an operating system executing on the endpoint 102 while in other embodiments the malware detection module 104 is a standalone application or part of another product. As shown in FIG. 3, the malware detection module 104 itself includes multiple modules.

A trust module 302 monitors file activity on the endpoint 102 and evaluates whether files are trustworthy. The trust module 302 monitors the endpoint 102 for the creation of files on the endpoint 102. The trust module 302 can monitor for the creation of specific types of files, such as executable files. For example, the trust module 302 may monitor for creation of files in the portable executable format, such as files of type .EXE and .DLL. In some embodiments the trust module 302 monitors for the creation of any type of file.

The trust module 302 also monitors file activity on the endpoint to detect when a file "touches" another file. A first file "touches" a second file when the first file performs an action that directly involves the second file. For example, a touch occurs when the first file creates, modifies, reads, downloads or executes the second file.

In one embodiment, the trust module 302 evaluates whether newly-created files are trustworthy by evaluating attributes of the files against trust criteria. The trust module 302 can also evaluate other files for trustworthiness, such as files that are touched by other files. In general, the degree of "trustworthiness" of a file represents the degree that the file can be trusted to be legitimate (i.e., to not be malicious). In general, the trust criteria are one or more factors for evaluating whether the file is trustworthy and in essence measure the risk that the file is malicious. If the trust module 302 determines that the file satisfies the trust criteria, it signifies that the file is trustworthy. In one embodiment, the trust module 302 receives the trust criteria from the server 106.

In one embodiment, the trust criteria used by the trust module 302 include whether the file includes a digital signature. The trust module 302 analyzes the file for a digital signature. The trust module 302 can also determine the identity of the entity that signed the file. In general, a file with a digital signature is considered more trustworthy than a file without such a signature because the origin of a signed file can be verified. Some signers can also be considered more trustworthy than other signers. In one embodiment, if a file includes a digital signature, the trust module 302 identifies the file as satisfying the trust criteria.

In another embodiment, the trust criteria used by the trust module 302 comprise the domain from which the file was received. The trust module 302 can determine the domain from which the file was received by, for example, monitoring network communications to identify communications that create files and/or analyzing attributes that specify the domain. Certain domains are trusted more than other domains to provide legitimate (non-malicious) software and, therefore, files from such domains are considered more trustworthy than files from less trustworthy domains.

One embodiment of the trust module 302 uses a white list of trusted domains to assess the domain from which the file was received. If the file was received from a domain on the white list, the trust module 302 determines that the file is trustworthy and satisfies the trust criteria. In combination with the white list or as an alternative, the trust module 302 can also use a black list of suspicious domains to assess the domain. If the domain from which the file was received is on the black list, the trust module 302 determines that the file is not trustworthy (i.e., is suspicious) and does not satisfy the trust criteria. Depending upon the embodiment, the trust module 302 can also determine that a file is suspicious if it is received from a domain not on the white list and/or determine that the file is trustworthy if it is received from a domain not on the black list.

In one embodiment, the trust criteria used by the trust module 302 to evaluate a file depends on the type of the file and/or how the file was created. For example, trust criteria comprising a white list and/or black list may only be used by the trust module 302 for files downloaded from the Internet. As another example, trust criteria of whether a file includes a digital signature may only be used by the trust module for executable files.

The trust module 302 labels the file based on the evaluation against the trust criteria. If the file satisfies the trust criteria, the trust module 302 labels the file as "trusted." However, if the file does not satisfy the trust criteria, the trust module 302 labels the file as "suspicious." As used herein, the term "process" refers to an instance of a file being executed. In one embodiment, a process inherits the label of the file on which it is based. When this description states that a file performs an action, it should be understood that what is meant is that the file is being executed and the resulting process is performing the action.

A package module 304 assigns files to packages. A "package" is a group of one or more files. The package module 304 can assign a file to an existing package or create a new package and assign a file to the new package. One embodiment of the package module 302 uses the results of the monitoring and labels applied by the trust module 302 to assign files to packages.

In one embodiment, the package module 304 assigns a file labeled "suspicious" to a package. If the suspicious file was touched (e.g., created) by a file that is already a member of a package, the suspicious file is assigned to the same package as the file that touched it. If the suspicious file was not touched by a file, or touched by a file that is not a member of a package, the package module 304 creates a new package and assigns the file to the new package. Embodiments of the package module 304 can also assign a file labeled "trusted" to a package. If a trusted file is touched by a file assigned to an existing package, the package module can assign the trusted file to the package of the file that touched it. In one embodiment, the package module 304 assigns only certain types of files to packages. For example, the package module 304 may assign only executable files to packages.

A behavior monitoring module 306 tracks the collective behavior of the files included in each package. In one embodiment, for each package, the behavior monitoring module 306 tracks all behaviors performed by files in the package. In another embodiment, for each package, the behavior monitoring module 306 tracks only suspicious behaviors performed by files in the package. A suspicious behavior is a behavior typically performed by malware, such as a file copying itself, a file writing to the registry of the operating system, communicating with a remote server via the network, etc. In one embodiment, the behavior monitoring module 306 receives from the server 106 information on the types of behaviors that are considered suspicious. In one embodiment, the behavior monitoring module 306 additionally tracks attributes of each package and attributes of the files within each package. Examples of attributes that the behavior monitoring module 306 may keep track of include: the number of files in a package, the type of each file in the package, the size of each file in the package, the number of times each file in the package has been accessed, etc.

The behavior monitoring module 306 maintains malware heuristics to determine whether files in a package are collectively performing malicious behavior and therefore comprise malware. Each malware heuristic is comprised one or more conditions that describe suspicious behaviors, attributes of packages, and/or attributes of files. For example, a malware heuristic may include the following conditions: a file in a package creating an executable file, a file in the package modifying the registry of the endpoint's 102 operating system, and the package containing at least 5 suspicious files. If a package satisfies the necessary conditions of a malware heuristic it indicates that the files included in the package are collectively performing malicious behavior. In one embodiment, the behavior monitoring module 306 receives the malware heuristics from the server 106.

For each package, the behavior monitoring module 306 determines whether the package satisfies a malware heuristic by comparing the collective behavior tracked and attributes tracked for the package to the conditions specified by the malware heuristics. In one embodiment, the behavior monitoring module 306 periodically determines whether a package satisfies a malware heuristic. In another embodiment, the monitoring module 306 determines whether a package satisfies a malware heuristic when a specific event occurs, such as a file performing a suspicious behavior.

In one embodiment, a package satisfies a malware heuristic if the collective behavior tracked and attributes tracked of the package satisfy every condition of the heuristic. In one embodiment, a package satisfies a malware heuristic if the collective behavior tracked and attributes tracked of the package satisfy at least a specific number of conditions of the heuristic.

In one embodiment, the behavior monitoring module 306 calculates a total score to determine whether a package satisfies a malware heuristic. Each condition of the heuristic contributes a certain amount of points to the total score, if the condition is satisfied by the collective behavior tracked and attributes tracked of the package. The behavior monitoring module 306 sums the points contributed by each condition to calculate the total score. If the total score calculated is above a threshold, the behavior monitoring module 306 determines that the package satisfies the malware heuristic. If a determination is made that a package satisfies a malware heuristic, the behavior monitoring module 306 flags the package as malware.

In one embodiment, the behavior monitoring module 306 creates reports to send to the server 106. Each report includes information on the collective behavior tracked for the files of a package. In one embodiment, the behavior monitoring module 306 only creates reports for those packages that have been flagged as malware. The behavior monitoring module 306 transmits the reports to the server 106 via the network 108.

A remediation module 308 convicts packages flagged as malware by the behavior monitoring module 306. In one embodiment, convicting a package comprises notifying a user of the malware. In one embodiment, convicting a package comprises remediating one or more files in the package. The remediation module 308 may remediate the files by for example, quarantining the files or deleting the files. In one embodiment, if a trusted file is included in the convicted package, the remediation module 308 will not remediate the trusted file, but will terminate the corresponding process instance that resulted in the trusted file being added to the package. In one embodiment, the remediation module 308 does not remediate critical files included in the package. Critical files are files (e.g., system files and configuration files) needed by the endpoint's 102 operating system in order to function properly. In one embodiment, the remediation module 308 convicts a package based on setting set by a user.

Figure 4:
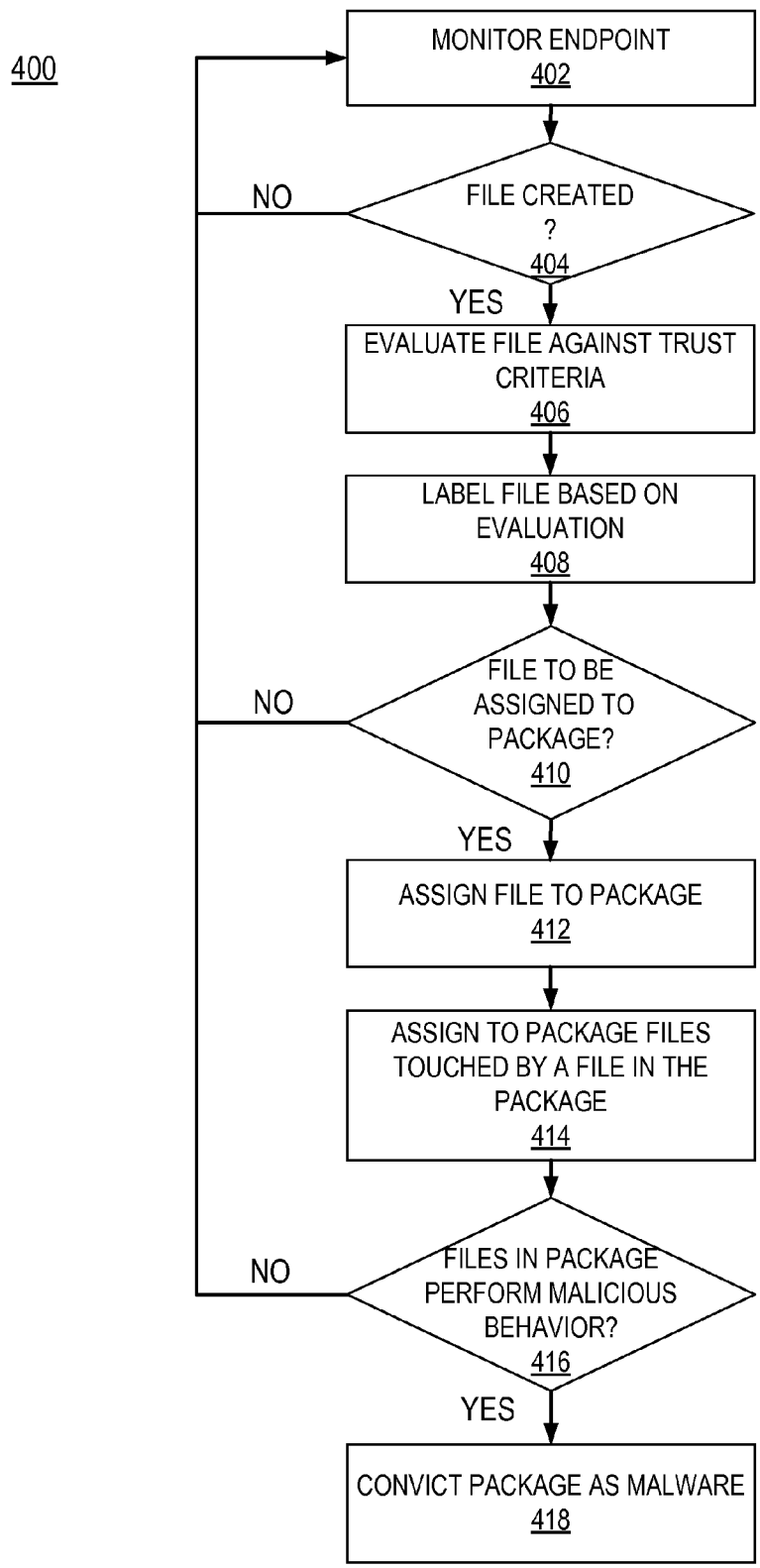
FIG. 4 is a flowchart illustrating steps performed by the malware detection module according to one embodiment.

FIG. 4 is a flowchart 400 illustrating steps performed by the malware detection module 104 according to one embodiment. Other embodiments perform the illustrated steps in different orders, and/or perform different or additional steps. Moreover, some or all of the steps can be performed by modules other than the malware detection module 104. Further, one or more of the illustrated steps can be performed simultaneously by the malware detection module 104.

The malware detection module 104 continuously monitors 402 the endpoint 102 for the creation of a file. In one embodiment, the malware detection module 104 monitors for the creation of a specific type of file. If the malware detection module 104 determines 404 that a file of a monitored-for type has been created, the malware detection module 104 evaluates 406 the file against trust criteria. The malware detection module 104 labels 408 the file based on the evaluation. If the file satisfies the trust criteria, the malware detection module 104 labels the file as trusted. If the file does not satisfy the trust criteria, the malware detection module 104 labels the file as suspicious.

The malware detection module 104 determines 410 whether to assign the file to a package. In one embodiment, the malware detection module 104 assigns 412 the file to a package if it is labeled as "suspicious." The suspicious file is assigned either to a previously-existing package or to a newly-created package. If the file is not being assigned to a package, the malware detection module 104 continues to monitor the endpoint 102. For each package on the endpoint 102, the malware detection module 104 assigns 414 to the package suspicious files touched (e.g., read) by a file in the package. In some embodiments, the malware detection module 104 also assigns to a package trusted files touched by a file in the package.

The malware detection module 104 determines 416 whether the files in a package collectively perform malicious behavior as specified by a malware heuristic. If the files in a package on the endpoint 102 do not collectively perform malicious behavior, the malware detection module 104 continues to monitor the endpoint 102. However, if the files in a package at the endpoint 102 collectively perform malicious behavior, the malware detection module 104 convicts 418 that package as malware.

The above description is included to illustrate the operation of the embodiments and is not meant to limit the scope of the invention. The scope of the invention is to be limited only by the following claims. From the above discussion, many variations will be apparent to one skilled in the relevant art that would yet be encompassed by the spirit and scope of the invention. As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

The invention claimed is:

1. A method for detecting malware on a computer system, comprising:

evaluating a first file on a computer system against trust criteria to determine whether the first file is compatible with the trust criteria;

responsive to the first file being incompatible with the trust criteria, assigning the first file to a package of one or more files;

monitoring the first file assigned to the package to determine whether the first file touches additional files on the computer system;

assigning a second file on the computer system to the package responsive to the second file being touched by the first file and the second file being incompatible with the trust criteria;

tracking collective behavior of the files assigned to the package;

comparing the collective behavior tracked for the files assigned to the package to conditions of a malware heuristic; and determining whether to convict the package as malware based on the comparison.

2. The method of claim 1, wherein evaluating the first file against trust criteria comprises analyzing attributes of the first file to determine whether the attributes satisfy one or more factors of the trust criteria.

3. The method of claim 1, further comprising:
determining that the first file is incompatible with the trust criteria responsive to the first file not including a digital signature.

4. The method of claim 1, further comprising:
determining that the first file is incompatible with the trust criteria responsive to the first file being received from a non-trusted domain.

5. The method of claim 1, wherein the second file is assigned to the package responsive to the second file being touched by the first file, the second file being incompatible with the trust criteria, and the second file being of a specified file type.

6. The method of claim 1, wherein the conditions of the malware heuristic include at least one of: a file in the package creating an executable file, a file in the package modifying a registry of a computer system operating system, and the package having a threshold number of assigned files incompatible with the trust criteria.

7. The method of claim 1, wherein tracking the collective behavior of the files assigned to the package comprises tracking at least one of: a number of files assigned to the package, a type of a file assigned to the package, a size of a file assigned to a package, a number of times a file in the package has been accessed, and a number of times a file in the package was touched or touched another file.

8. The method of claim 1, further comprising:
tracking attributes of the package; and
comparing the attributes and the collective behavior to the conditions of the malware heuristic.

9. A non-transitory computer-readable storage medium having computer-executable code for detecting malware on a computer system, the computer-executable code comprising:
a trust module configured to:
evaluate a first file on a computer system against trust criteria to determine whether the first file is compatible with the trust criteria;
a package module configured to:
assign the first file to a package of one or more files in response to the first file being incompatible with the trust criteria;
monitor the first file assigned to the package to determine whether the first file touches additional files on the computer system; and
assign a second file on the computer system to the package responsive to the second file being touched by the first file and the second file being incompatible with the trust criteria;
a behavior monitoring module configured to:
track collective behavior of the files assigned to the package; and
compare the collective behavior tracked for the files assigned to the package to conditions of a malware heuristic; and
a remediation module configured to determine whether to convict the package as malware based on the comparison.

10. The computer-readable storage medium of claim 9, wherein the trust module is further configured to:
analyze attributes of the first file to determine whether the attributes satisfy one or more factors of the trust criteria.

11. The computer-readable storage medium of claim 9, wherein the trust module is further configured to:
determine that the first file is incompatible with the trust criteria responsive to the first file not including a digital signature.

12. The computer-readable storage medium of claim 9, wherein the trust module is further configured to:
determine that the first file is incompatible with the trust criteria responsive to the first file being received from a non-trusted domain.

13. The computer-readable storage medium of claim 9, wherein the second file is assigned to the package responsive to the second file being touched by the first file, the second file being incompatible with the trust criteria, and the second file being of a specified file type.

14. The computer-readable storage medium of claim 9, wherein the conditions of the malware heuristic include at least one of: a file in the package creating an executable file, a file in the package modifying a registry of a computer system operating system, and the package having a threshold number of assigned files incompatible with the trust criteria.

15. The computer-readable storage medium of claim 9, wherein the behavior monitoring module is further configured to track at least one of: a number of files assigned to the package, a type of a file assigned to the package, a size of a file assigned to a package, a number of times a file in the package has been accessed, and a number of times a file in the package was touched or touched another file.

16. A computer system configured to detect malware on the computer system, the computer-executable code comprising:
a computer processor; and
a non-transitory computer-readable storage medium storing computer program modules configured to execute on the computer processor, the computer program modules comprising:
a trust module configured to:
evaluate a first file on a computer system against trust criteria to determine whether the first file is compatible with the trust criteria;
a package module configured to:
assign the first file to a package of one or more files in response to the first file being incompatible with the trust criteria;
monitor the first file assigned to the package to determine whether the first file touches additional files on the computer system; and assign a second file on the computer system to the package responsive to the second file being touched by the first file and the second file being incompatible with the trust criteria;

a behavior monitoring module configured to:
track collective behavior of the files assigned to the package; and
compare the collective behavior tracked for the files assigned to the package to conditions of a malware heuristic; and a remediation module configured to determine whether to convict the package as malware based on the comparison.

17. The computer system of claim 16, wherein the trust module is further configured to:
determine that the first file is incompatible with the trust criteria responsive to the first file not including a digital signature.

18. The computer system of claim 16, wherein the second file is assigned to the package responsive to the second file being touched by the first file, the second file being incompatible with the trust criteria, and the second file being of a specified file type.

19. The computer system of claim 16, wherein the conditions of the malware heuristic include at least one of: a file in the package creating an executable file, a file in the package modifying a registry of a computer system operating system, and the package having a threshold number of assigned files incompatible with the trust criteria.

20. The computer system of claim 16, wherein the behavior monitoring module is further configured to track at least one of: a number of files assigned to the package, a type of a file assigned to the package, a size of a file assigned to a package, a number of times a file in the package has been accessed, and a number of times a file in the package was touched or touched another file.

* * * * *